March 20, 1962 M. L. SMITH ET AL 3,026,194
POTASH TREATING PROCESS
Filed Aug. 31, 1959

MILLARD L. SMITH
RICHARD E. WITMAN
INVENTOR.

BY J. Vincent Martin
Joe E. Edwards
M. Gray
ATTORNEYS

3,026,194
POTASH TREATING PROCESS
Millard L. Smith and Richard E. Witman, Carlsbad, N. Mex., assignors to Duval Sulphur & Potash Company, Houston, Tex., a corporation of Texas
Filed Aug. 31, 1959, Ser. No. 837,156
8 Claims. (Cl. 71—64)

This invention relates to fertilizers, and more particularly to a process for improving the physical characteristics of particles of fertilizer made by compacting fines and thereafter breaking them into larger particles.

In the conventional production of potash, such as muriate of potash, for fertilizer, the fine potash particles inherent in the usual methods of production are extremely objectionable. These so-called fines not only cause serious dust problems in storage, handling and application, with resultant loss of material, but also aggravate caking problems by magnifying the hydroscopicity of the material due to their high surface-to-weight ratio. Due to these and other objectionable qualities, the fertilizer industry demands products with an absolute minimum of fines and a maximum of relatively coarse particles. This demand can be met efficiently by several process techniques, one of which is a compacting process that compresses relatively fine material into a sheet of ribbon which, when subsequently crushed, produces a product of desirable size. In some processes fines are compacted dry. In other processes they are compacted wet. In an example of the latter process fines are mixed with water saturated with the constituents of the fines and passed through compacting rolls at a temperature in excess of 200 degrees. The fines are thereafter broken or crushed to provide the desired sized product. See Patent No. 2,935,387, issued on May 3, 1960, to Ira B. Phillips for Compacting Process for Producing a Granular Product, for a full discussion of this compacting process. Unfortunately the granules resulting from such processes have angular exteriors and are somewhat porous. When these granules are subjected to normal handling, such as transportation, application, or further processing, they degrade physically and at least partially return to the fine material from which they were produced.

It is an object of this invention to provide a method whereby granular particles produced by a compacting process are improved in physical competency.

Another object is to provide a process for producing, from coarse particles of potash from a compacting process, ultimate granules of physical competency such that will withstand subsequent handling without degradation.

Another object is to provide a process for treating granules produced by a compacting process which will substantially prevent the granules from degrading physically and returning to the fine material from which they were produced.

Another object is to provide a method whereby granular particles produced by a compacting process are improved in physical competency while simultaneously upgrading the product.

Other objects, features and advantages of the invention will be apparent from the drawings, the specification and the claims.

In the drawings, wherein illustrative embodiments of this invention are shown:

While the improved process will be described herein as it relates to muriate of potash, it is obvious that it would be applicable to similar materials and salts.

Figure 1:
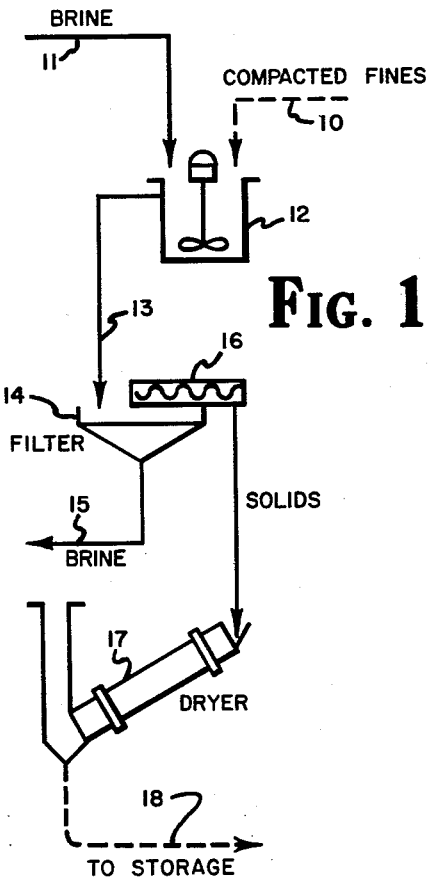
FIGURE 1 is a flow diagram illustrating the method of this invention.

Referring first to FIGURE 1, the numeral 10 designates a feed inlet line through which the granular particles of muriate of potash from a compacter process are conducted to the system. A predetermined volume of liquid, which is substantially saturated with respect to the granular solids at the temperature of the solids, is simultaneously conducted through line 11 to the agitator tank 12. It is preferred to use water completely saturated with the constituents of the fines, as brine, for this process. If it is desired to upgrade the product, either water or water saturated with potassium chloride and having little or no content of sodium chloride might be used. In either case, some of the sodium chloride in the fines would be dissolved into the water, and the product slightly upgraded.

In the agitator 12 the surface of the solids is thoroughly wetted by the liquid and the resulting slurry in conveyed through line 13 to filter 14. The liquid or filtrate issuing from filter 14 is conveyed through line 15 to waste, subsequent processing, or re-cycling to line 11, in the discretion of the operator. The solids or cake from filter 14 are transported by the conveying device 16 to dryer 17. The filter is of a well known type which rotates, and, after the filtrate has been substantially removed from the solids, moves into contact with the conveyor 16 which removes it from the filter.

The solids are dried in dryer 17 and discharged through conduit 18 to storage.

Figure 2:
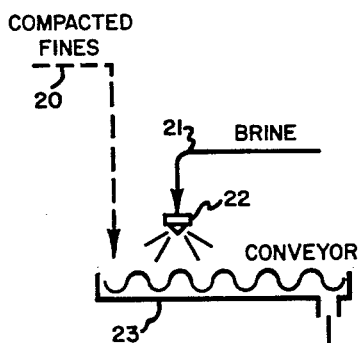
FIGURE 2 is a similar diagram illustrating a slight modification of the process of this invention.

In FIGURE 2, a modified arrangement of the process is illustrated. In this arrangement, the granular particles from a compacting process are fed into the system through line 20 onto a screw conveyor 23. A predetermined volume of liquid substantially saturated with the constituents of the solids, is conveyed through line 21 and spray nozzle 22, where it is discharged into the solids being conveyed by conveyor 23. A slightly unsaturated brine is preferred with the FIGURE 2 system to avoid clogging the nozzles, etc. of the system. The wetted solids are then conducted through line 24 to dryer 25 and discharged through conduit 26 to storage.

It has been found through the practice of the process shown in FIGURE 2 that, while the addition of any amount of liquid results in a beneficial effect, the addition of at least 1% by weight with respect to the solids gives uniform wetting and assures full benefits.

In the practice of the method as above described, it has been discovered that wetting of the typically angular and somewhat porous granular particles results in effectively reducing the angularity of the particles and sealing of the surface interstices and pores, such that upon subsequent drying there results a hard and relatively impervious shell around each granule. In addition, the shape of the treated granule is such that a minimum of friable edges remain. It is believed that the liquid penetrates at least partially into each particle and softens the sharp, angular portions of the particle. Then, upon drying, the angularity of the particle is reduced. The solids which had previously saturated the brine, deposit out on the particle to at least partially close the surface interstices and pores. Where the solution of potassium chloride is used, the deposited potassium chloride will accomplish these functions. Where fresh water is used, a portion of the particles will dissolve in the water and accomplish these functions. These cumulative effects yield particles highly competent to withstand the degrading effects of subsequent handling, as will be demonstrated by experimental results.

Typically granular particles from a compacter process tend to be somewhat impure chemically, because, in the normal sylvite recovery operation, those fine particles of product used to feed compacter processes contain a greater percentage of waste material than do the intermediate sized particles. Should it be desired, in the practice of this invention, to improve the chemical quality of the finished granule, this can be adroitly accomplished by using as the liquid either fresh water or a solution of potassium chloride rather than the more readily available plant brine which is normally contaminated with waste solution. Obviously, the solution of potassium chloride will add pure potash to the product upon evaporation of water to upgrade the product. As water will take up approximately twice as much sodium chloride as potassium chloride, the use of fresh water in the FIGURE 1 form of the process will remove more sodium chloride than potassium chloride, and in this manner upgrade the product. Each of the above liquids provides a water base liquid for treating the granules.

To illustrate the advantages and improved results produced by the use of this process, a series of pilot plant tests were conducted. A reproducible procedure for control degradation of the granular products was devised, and granules from the compacter plant treated in accordance with this invention were compared with untreated compacter plant discharge material as a yard stick. Feed material was muriate of potash from the Carlsbad, New Mexico, mine and refinery of Duval Sulphur & Potash Company.

Figure 3:
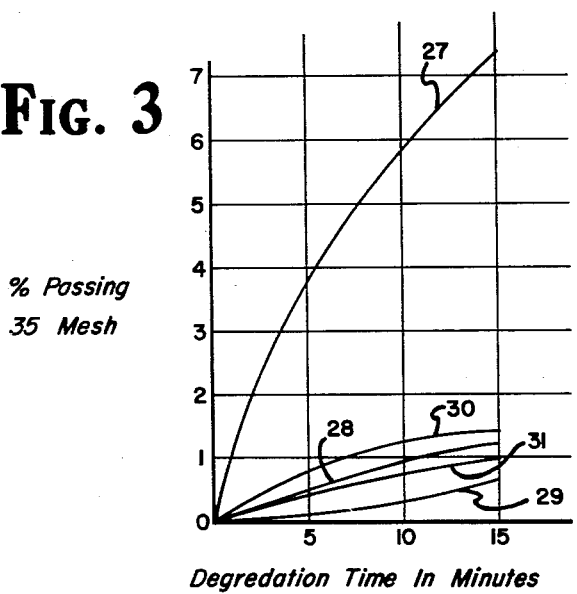
FIGURE 3 is a graph comparing potash prepared by compacting and crushing fines before and after being treated in accordance with this invention.

Products from pilot plant tests, using both flow sheets illustrated by FIGURES 1 and 2, were dried to essentially zero moisture. These samples, together with control samples of compacted granules, were individually screened on 35 mesh screens, and the plus fractions split down into 450 gram samples. These samples were then subjected to controlled degradation using a laboratory rod mill charged with rubber covered rods. Individual 450 gram samples were milled for five minutes, removed from the rod mill, and screened. This procedure was repeated for a total time of fifteen minutes. Test results are indicated in the table of FIGURE 3, in which the percentage of product passing a 35 mesh screen is charted against degradation time in minutes. The curves are plotted mean averages of numerous tests.

Curve 27 illustrates the effect of degradation procedure on untreated granular muriate of potash produced by compaction. This degradation simulates the result of normal handling and processing, and represents a poor quality material of low customer appeal.

Curve 28 depicts the degradation of material treated using the flow sheet of FIGURE 1 and a centrifugal separator for dewatering. The centrifugal separator reduced the moisture in the dryer feed to 3.1%. After fifteen minutes of degrading time, only 1.3% of the material passed a 35 mesh screen. The product is almost dustless, and is of high competency.

Curve 29 illustrates the use of a classifier as a dewatering device in the flow sheet of FIGURE 1. Moisture was reduced to 7.4% prior to drying. After degradation, only 0.6% of the material was finer than 35 mesh.

Curve 30 is the result of a pilot test run using a horizontal filter as depicted in the flow sheet of FIGURE 1. After immersion, the granular material was dewatered to 6.5% moisture prior to drying. Here again, as in curves 28 and 29, the finer product showed a minimum of degradation.

Curve 31 presents the data on a pilot test run using the modified flow sheet of FIGURE 2. Moisture prior to drying was 1.1%. Degradation for fifteen minutes produced 1.0% in 35 mesh fines.

Curves 28 through 31 clearly demonstrate that the practice of this invention yields a granule well able to withstand the effect of handling and processing, and one which will maintain customer appeal.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. The method of improving muriate of potash particles previously compacted and dried from fines comprising, wetting said particles with a useful amount of an aqueous solution, and drying the particles, whereby the physical competency of the particles is improved.

2. The method of improving muriate of potash particles previously compacted and dried from fines comprising, wetting said particles with a useful amount of an aqueous solution in an amount of at least approximately 1% by weight with respect to the particles, and drying the particles, whereby physical competency of the particles is improved.

3. The method of improving muriate of potash particles previously compacted and dried from fines comprising, wetting said particles with fresh water, and drying the particles, whereby the physical competency of the particles is improved.

4. The method of improving muriate of potash particles previously compacted and dried from fines comprising, wetting said particles with fresh water in an amount of at least approximately 1% by weight with respect to the particles, and drying the particles, whereby the physical competency of the particles is improved.

5. The method of improved muriate of potash particles previously compacted and dried from fines comprising, wetting said particles with a substantially saturated water solution of potassium chloride, and drying the particles, whereby the physical competency of the particles in improved.

6. The method of improving muriate of potash particles previously compacted and dried from fines comprising, wetting said particles with a substantially saturated water solution of potassium chloride in an amount of at least approximately 1% by weight with respect to the particles, and drying the particles, whereby the physical competency of the particles is improved.

7. The method of improving muriate of potash particles previously compacted and dried from fines comprising, wetting said particles with a substantially saturated water solution of the constituents of said particles, and drying the particles, whereby the physical competency of the particles is improved.

8. The method of improving muriate of potash particles previously compacted and dried from fines comprising, wetting said particles with a substantially saturated water solution of the constituents of said particles in an amount of at least approximately 1% by weight with respect to the particles, and drying the particles, whereby the physical competency of the particles is improved.

References Cited in the file of this patent

UNITED STATES PATENTS

| 2,107,702 | Haase et al. | Feb. 8, 1938 |
| 2,297,300 | Hardesty et al. | Sept. 29, 1942 |
| 2,935,387 | Phillips | May 3, 1960 |

FOREIGN PATENTS

| 1,202,966 | France | July 27, 1959 |